United States Patent [19]

Kudo

[11] Patent Number: 5,454,075
[45] Date of Patent: Sep. 26, 1995

[54] DEVICE AND METHOD FOR MULTIPLE DISPLAY SYSTEM HAVING STORAGE MEANS FOR ENLARGED IMAGES

[75] Inventor: Yoji Kudo, Tochigiken, Japan

[73] Assignee: Kabushiki Kaisha Toshiba, Kawasaki, Japan

[21] Appl. No.: 115,044

[22] Filed: Sep. 1, 1993

[30] Foreign Application Priority Data

Sep. 1, 1992 [JP] Japan ..................... 4-233293

[51] Int. Cl.$^6$ ..................................... G06F 15/00
[52] U.S. Cl. ..................... 395/164; 345/201; 345/1
[58] Field of Search ..................... 395/162, 164, 395/153, 155, 157; 345/1.4, 201; 364/413.01, 413.02

[56] References Cited

U.S. PATENT DOCUMENTS

| 4,051,522 | 9/1977 | Healy et al. ................................. 345/1 |
| 4,965,559 | 10/1990 | Dye ............................................. 345/1 |
| 5,235,681 | 8/1993 | Masuzaki et al. ....................... 395/164 |

FOREIGN PATENT DOCUMENTS

5-16071  3/1993  Japan .

*Primary Examiner*—Mark R. Powell
*Assistant Examiner*—Kee M. Tung
*Attorney, Agent, or Firm*—Oblon, Spivak, McClelland, Maier, & Neustadt

[57] ABSTRACT

A multiple display system to facilitate a further convenience and achieve a high-speed operation for use with a patient diagnosing equipment. The system includes a first memory unit for storing a plurality of images; a second memory unit, which stores the images stored in the first memory unit and operates at a higher speed than the first memory unit and is equipped with a greater memory region than that allocated for storing images to be displayed, and which stores the plural images supplied from the first memory units; an input portion for inputting an instruction to smoothly and continuously change the plural images in a substantially simultaneous manner; a display interface portion which selects a plurality of memory regions of the second memory unit, and which reads the plural memory regions; and a display unit for displaying respective plural images read out of the display interface portion.

6 Claims, 11 Drawing Sheets

FIRST MEMORY UNIT

IMAGE STORED IN IMAGE MEMORY

IMAGE ON DISPLAY

IMAGE POSSIBLY DISPLAYED NEXT

| 34 | 35 | 36 |
|---|---|---|
| 44 | 45 | 46 |

FIG.9B

| 45 | 46 | 47 |
|---|---|---|
| 55 | 56 | 57 |

FIG.15A

| 10 | 12 | 14 |
|---|---|---|
| 11 | 13 | 15 |

FIG.15B

| 12 | 14 | 16 |
|---|---|---|
| 13 | 15 | 17 |

FIG.15C

| 48 | 50 | 00 |
|---|---|---|
| 49 | 51 | 01 |

FIG. 17C

DEVICE AND METHOD FOR MULTIPLE DISPLAY SYSTEM HAVING STORAGE MEANS FOR ENLARGED IMAGES

BACKGROUND OF THE INVENTION

Technical Field

The present invention relates to a multiple display system where plural images are displayed on a display unit.

Background Art

Figure 1:
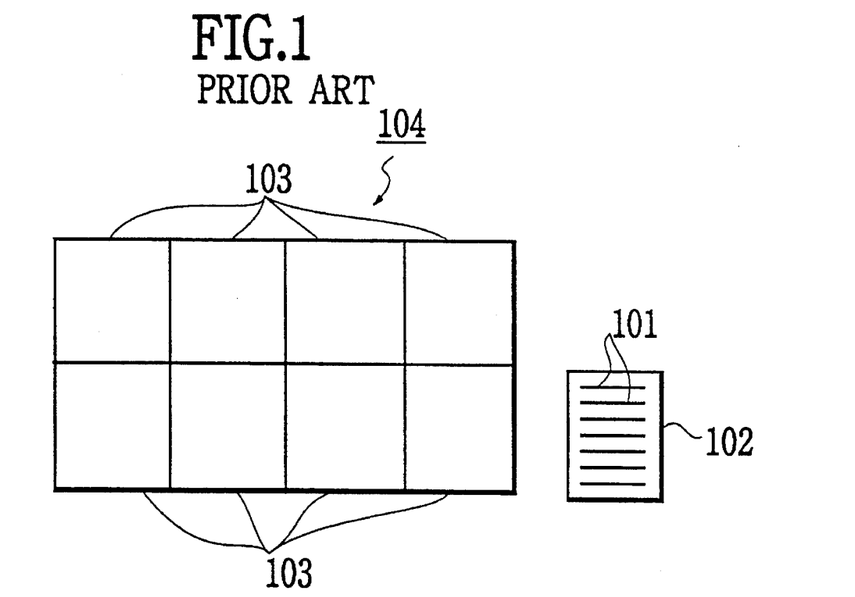
FIG. 1 shows a display example of the conventional multiple CRT system.

With reference to FIG. 1, as an example in the field of medical equipment, a series of image list 101 concerning a patient as an object is displayed in interactive display system 102. The displayed image is selected utilizing an interactive mode, so that each image indicated responsive to the selection performed under the interactive mode is displayed on an image plane 103 of a multiple display system. Such plural images can be used for a comparison with data measured in the past and under different conditions set forth therefor.

However, the list 101 as well as the interactive display system 102 for displaying the list 101 are independently installed from the image plane 103. The listing 101 alone can not render a content thereof, that is, image information that the listing 101 might have. Moreover, in the conventional multiple display system, the list 101 for retrieving image information therefrom is displayed on the interactive displaying means 102 such as a Cathode Ray Tube (CRT) so that an Image to be displayed on the image display system 104 is selected. Thereby, a single image is selected on request, so that there is consumed time required for performing such a selection and displaying, thus causing an operational loss.

SUMMARY OF THE INVENTION

In view of the foregoing drawbacks, it is therefore an object of the present invention to provide a multiple display device capable of displaying and selecting an image on request at ease while directly viewing and confirming the image plane.

To achieve the object, there is provided a multiple display device, comprising: a first memory means for storing a plurality of images; a second memory means, which stores the images stored in the first memory means and executes in a further high-speed manner than the first memory means, which is equipped with a greater memory region than that allocated for storing images to be displayed, and which stores the plural images supplied from the first memory means; an input portion for inputting an instruction to smoothly and continuously change the plural images in a substantially simultaneous manner; an display interface portion which selects a plurality of memory regions in the second memory means, and which reads the plural memory regions; and a display means for displaying respective plural images read out of the display interface portion.

Other features and advantages of the present invention will become apparent from the following description taken in conjunction with the accompanying drawings.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

Figure 2:
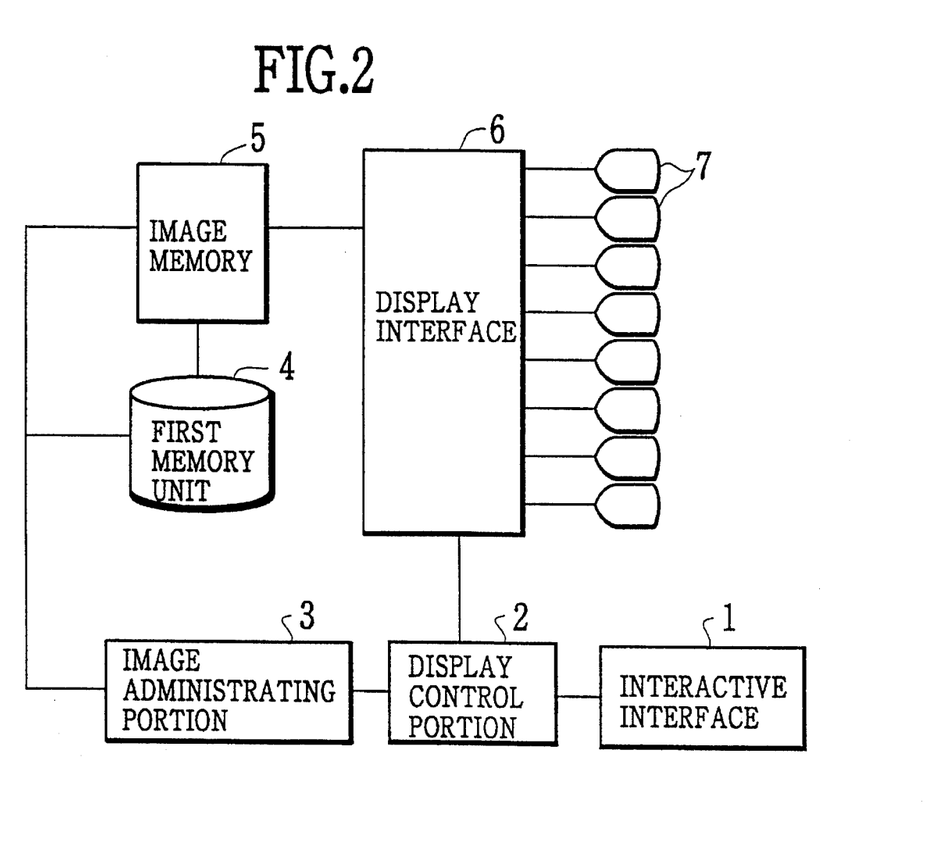
FIG. 2 shows a configurational block diagram for a multiple display device according to the present invention.

FIG. 2 is a block diagram illustrating an exemplary configuration for a multiple display device according to the present invention. In the same figure, the multiple display device comprises interactive interface 1, display control portion 2, image administrating portion 3, first memory unit 4, image memory 5 serving as a second memory means, display interface 6, and a plurality of display equipment 7. An operator operates an input device such as a mouse that constitutes interactive interface 1, while viewing a content of an image displayed on each display equipment 7. Thereby, the image displayed on each display equipment 7 is continuously changed for an optimum facility viewing data shown on display equipment 7.

Interactive interface 1 is equipped with the input device such as the mouse. When the input device is operated, a signal responsive to an operational content of the input device is generated so as to be supplied to display control portion 2.

Display control portion 2 generates various kinds of control signals necessary for processing a displaying operation, based on a signal output from display control portion 2. Thereafter, the control signals thus generated are fed to image administrating portion 3 and display interface 6.

Image administrating portion 3 generates a selection signal according to the control signals output from display control portion 2. The selection signal that indicates an image number for an object to be displayed, is supplied to first memory unit 4 and image memory 5.

Figure 3:
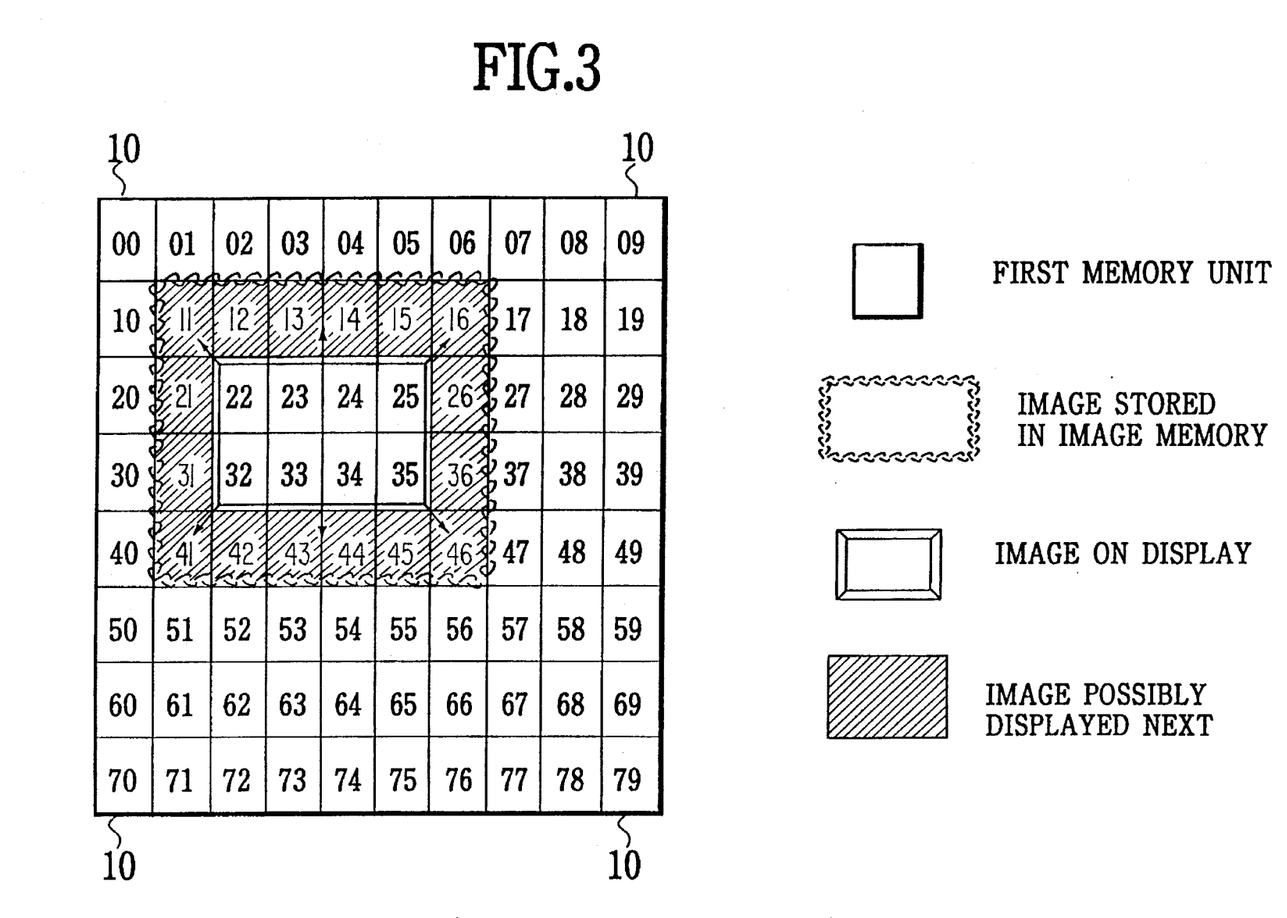
FIG. 3 is an illustrative drawing to explain an example where the second image memory 5 stores an enlarged region encompassing the displayed image, employing the configuration shown in FIG. 2.

With reference to FIG. 3, first memory unit 4 stores a plurality of pictures 10 by means of a hard disk, optical magnetic disk, or the like. The image 10 having a picture number selected by the selection signal output from image administrating portion 3, is read out so as to be fed to image memory 5.

Then, an image region which is greater than that displayed on each display equipment 7, is read out responsive to the selection signal output from image administrating portion 3, so that the image of an enlarged area that encompasses the displayed picture on the equipment is fed to and stored in image memory 5.

Figure 4:
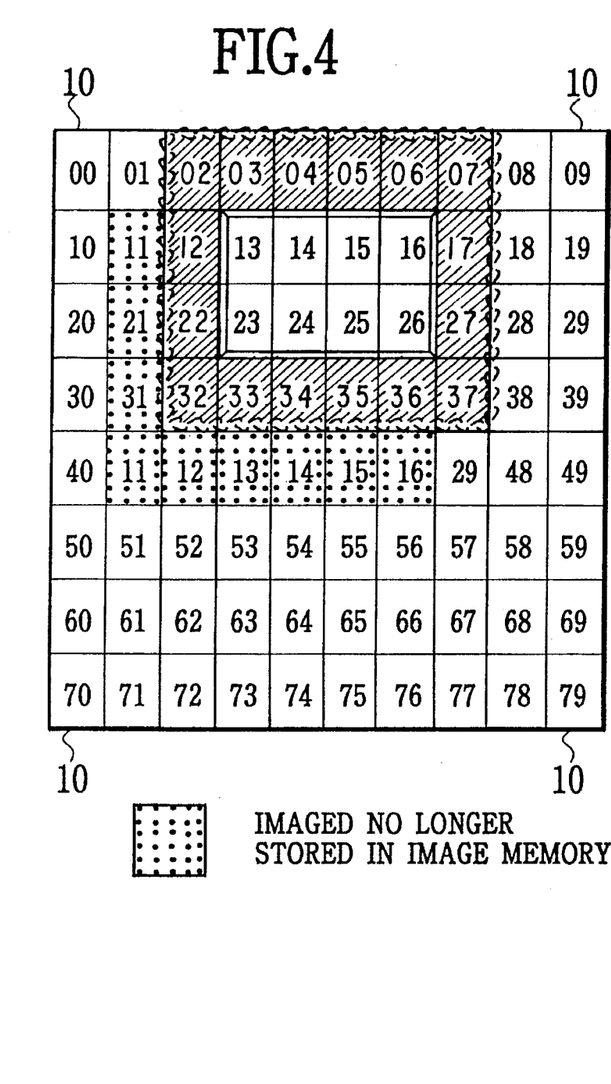
FIG. 4 is a continuing figure from FIG. 3 showing the enlarged area and an area of images no longer stored in the image memory 5.

With reference to FIG. 4, image memory 5 takes in and stores respective pictures 10 outputted from first memory unit 4, and discharges images not contained in the enlarged area specified by the selection signal. Thereafter, read out is the image specified by a read signal of display interface 6. Thereafter, the read-out image is fed to display interface 6.

Display interface 6 reads out images 10 that have picture numbers indicating a to-be displayed object, then the read-out images are supplied to respective display equipment 7.

Respective display equipment 7 takes in respective images 10 outputted from display interface 6 so as to be displayed thereon.

Figure 5:
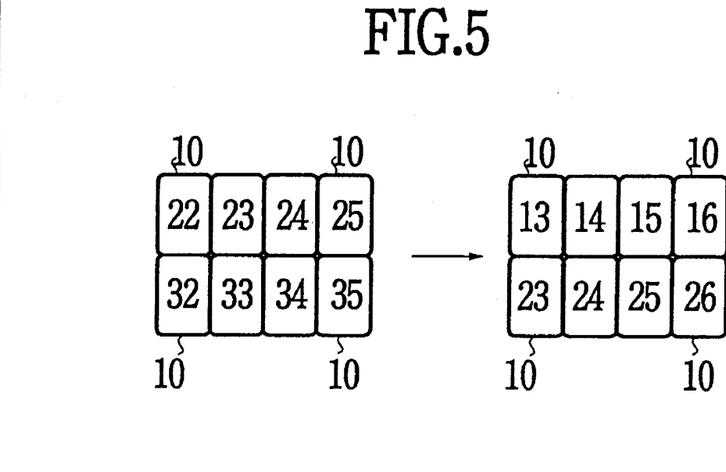
FIG. 5 shows how the picture frames on the display device are changed according to FIG. 4.
Figure 6A:
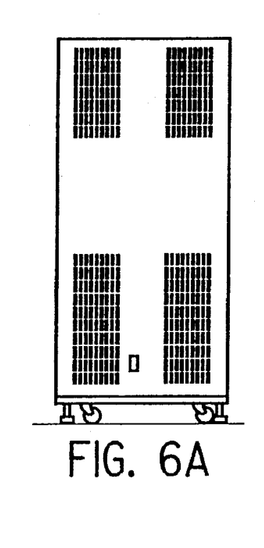
FIG. 6 shows a storage portion from a back and both sides thereof and an overview of the multiple display device from a front and a side thereof, according to the present invention.
Figure 6B:
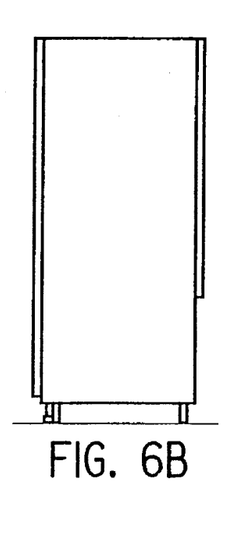
Figure 6C:
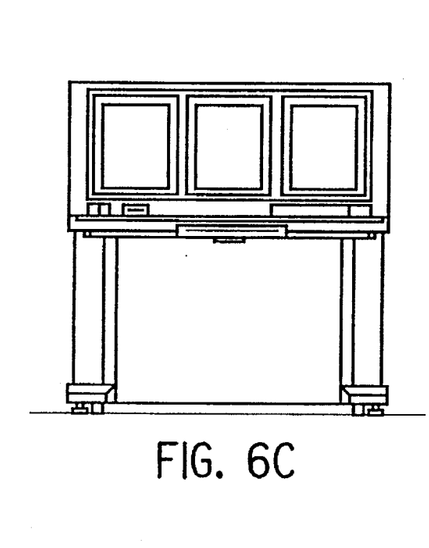
Figure 6D:
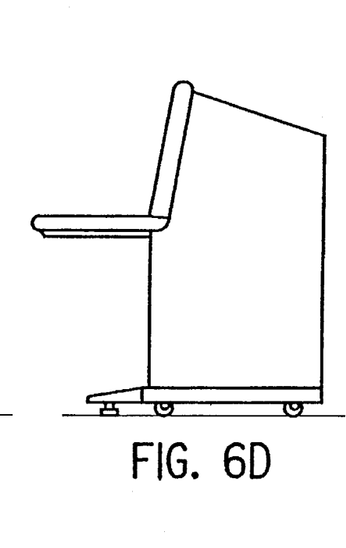
Figure 7A:
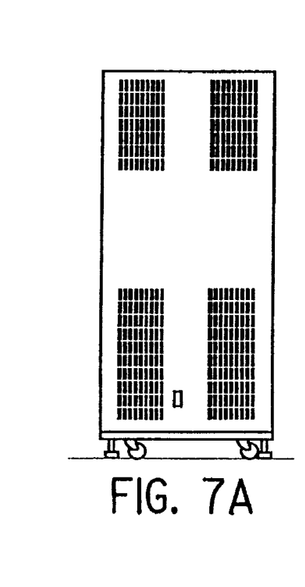
FIG. 7 is another example corresponding to FIG. 6.
Figure 7B:
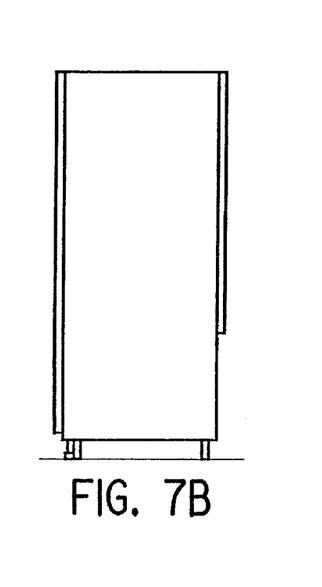
Figure 7C:
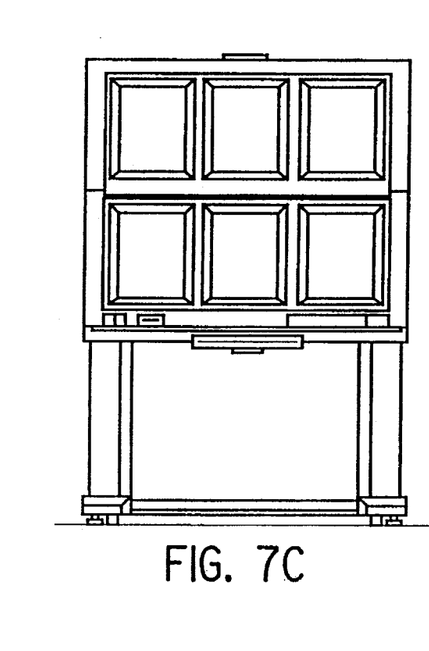
Figure 7D:
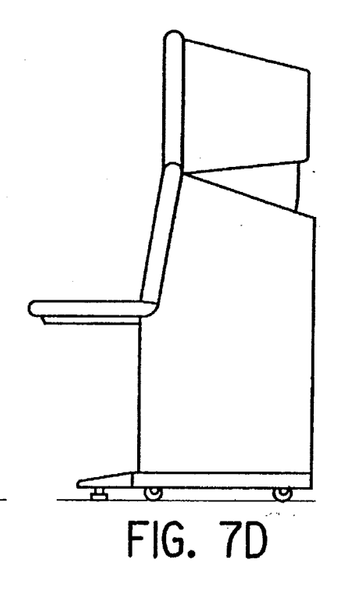

As has been described before, the present invention is characterized in that the enlarged image area is stored in image memory 5; the image stored in image memory 5 contains a wider image-area than the image displayed on display equipment 7. As a result thereof, an object portion to be displayed can be freely changed in every direction. Moreover, by changing the picture number of the image to be read out of image memory 5 by means of display interface 6, image 10 displayed on respective display equipment 7 can be changed at a significantly fast speed, thus also realizing a very smooth transfer of the picture plane, as shown in FIG. 5.

FIG. 6 and FIG. 7 show an example of the multiple display device. FIG. 6 is an overview of the multiple display device comprised of a image memory and a three-unit display equipment. From left to right in FIG. 6 are backside and side views of the image memory, and front and side views of the display equipment. Similarly, FIG. 6 shows another multiple-display device where there are 2-level 6unit display equipment therein.

Figure 8:
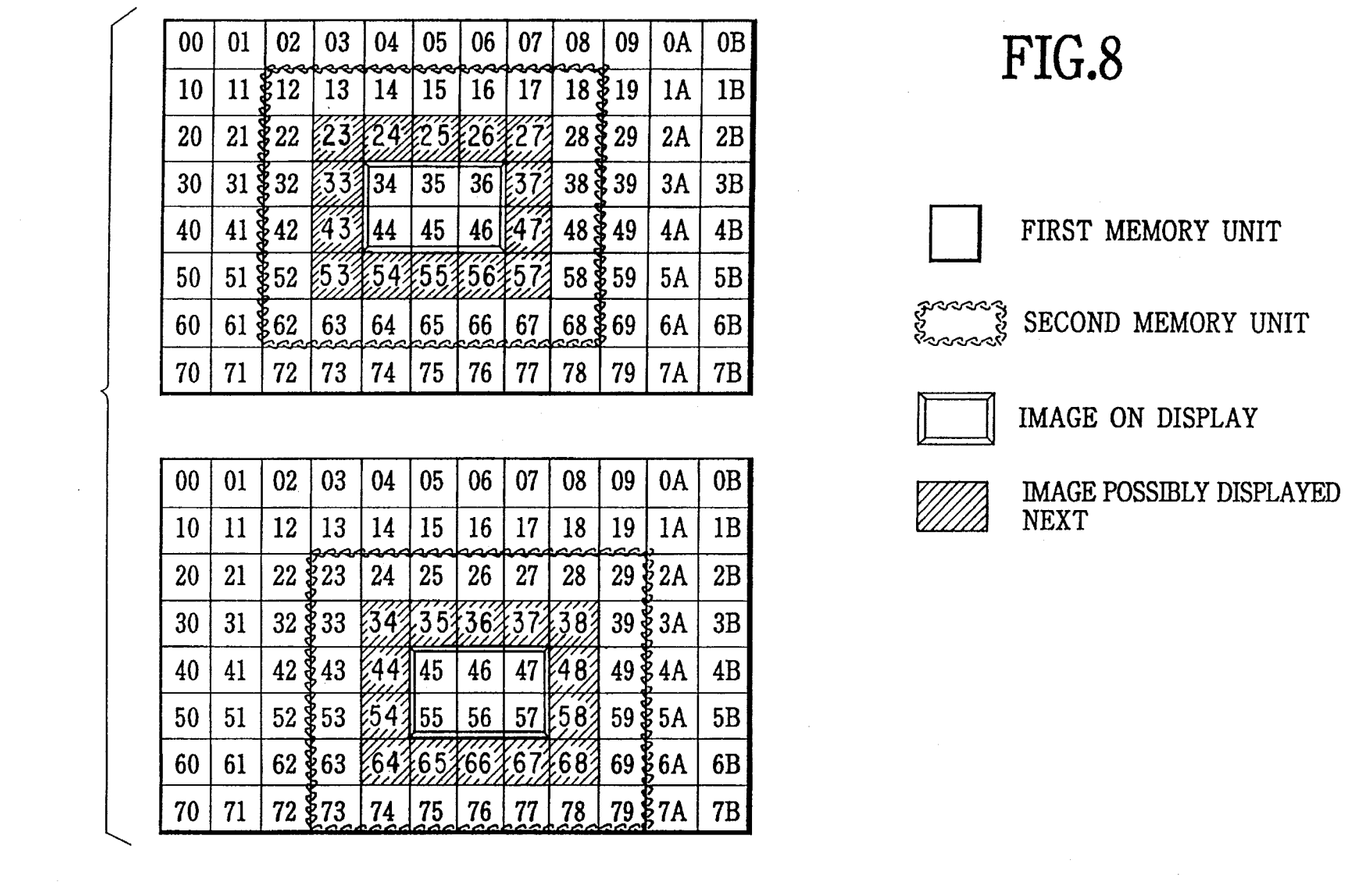
FIG. 8 is another example for the embodiment for the present invention, where the second image memory 5 stores a further enlarged area than that shown in FIG. 3; the result of changing the displayed images is shown in FIG. 9A and 9B.
Figure 9A:
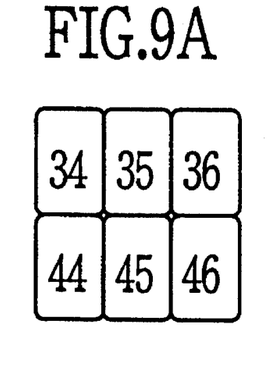
FIGS. 9A and 9B how the result of changement of the displayed pictures of before and after the changing.
Figure 9B:
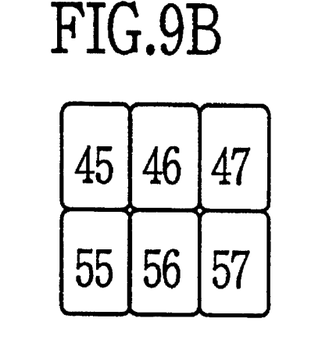

Notice that the image area stored in the image memory is the one that contains a slightly larger image area than the displayed image area as shown in FIG. 3 and FIG. 4. It shall be appreciated that, referring to FIG. 8, the stored image area in the image memory may be further larger than the previously selected "slightly larger image area". In this latter case employing to store the further larger image area than one displayed on the display equipment, the image can be changed in further advancedly faster than a case shown in FIG. 3. Then, it may be preferred to provide additionally another image memory, coupled to image memory 5, capable of coping with possibly increased information thereby. This additional image memory serves to be an auxiliary memory device in terms of image memory capacity. FIGS. 9A and 9B show displayed pictures as per FIG. 8, respectively.

Figure 10A:
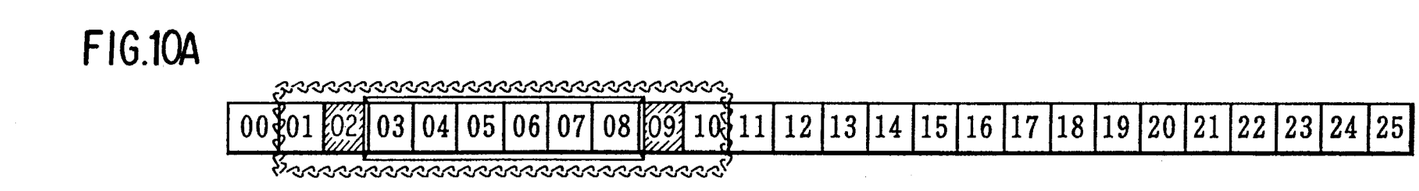
FIGS. 10A through 10C show information of images which are horizontally arranged in 12 sequential manner.
Figure 10B:
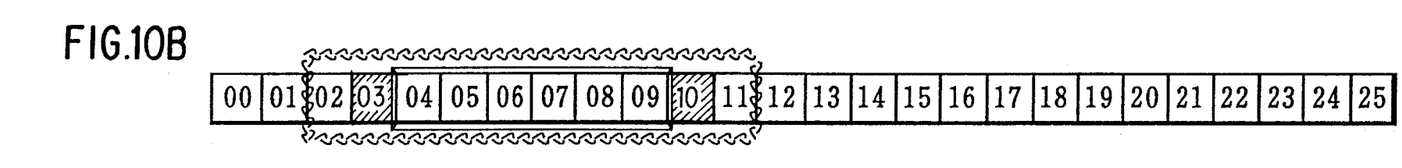
Figure 10C:
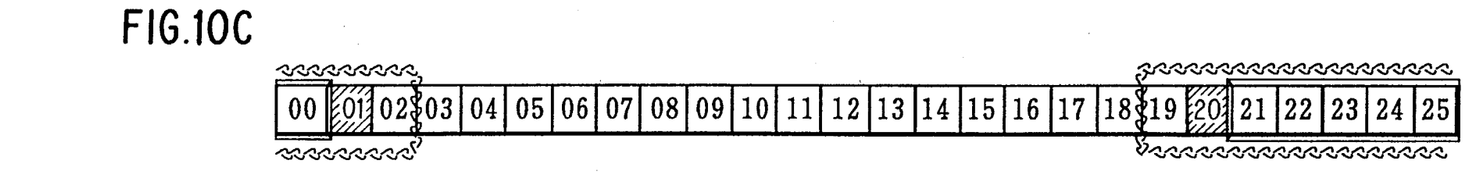

There occur many cases where the image is displayed in the order of a unit of a patient and inspection performed therefor. In that case, it is usually preferable to display the image in a manner that the image is smoothly changed in a sequential direction. FIG. 10 shows an arrangement of the image is drawn on a hard disk serving as the first memory means. Each image is controlled and administered one-dimensionally. With reference to FIG. 10, pictures numbered 01 through 10 are read into the image memory, in advance of being displayed on the display equipment. First, images 03, 04, 05, 06, 07 and 08 are displayed on the display equipment, as shown in FIG. 10A. Next, for instance, the images are shifted to the right by a picture. Then, since image 09 is previously read into the image memory as shown in FIG. 10A, the whole image is shifted in a significantly high-sped manner. In a similar manner, the image is shifted sequentially. With reference to FIG. 10C, when the image area reaches to a last picture of a single row, the images in question can contain the first portion of picture in the row. In a case where the image in the hard disk or the like is stored in a coherent inspection unit or a group, it is utmost efficient and convenient to display the image in a cyclic manner as shown in FIGS. 10A–10C.

Figure 11A:
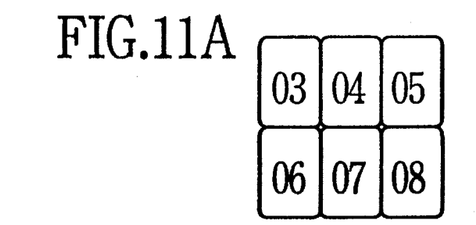
FIGS. 11A through 11C respectively show displayed images corresponding to FIGS. 10A–10C.
Figure 11B:
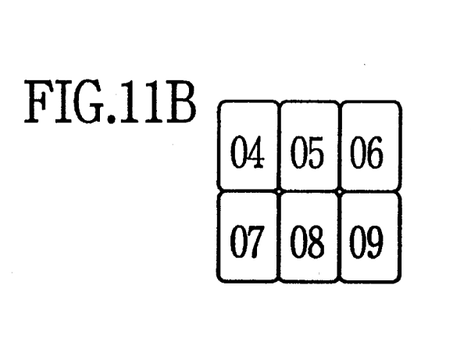
Figure 11C:
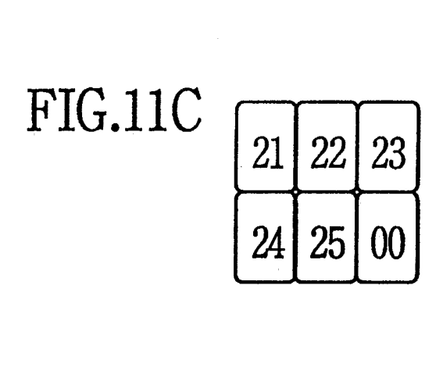

FIGS. 11A, 11b and 11C respectively show displayed images corresponding to FIGS. 10A, 10B and 10C.

Figure 14A:
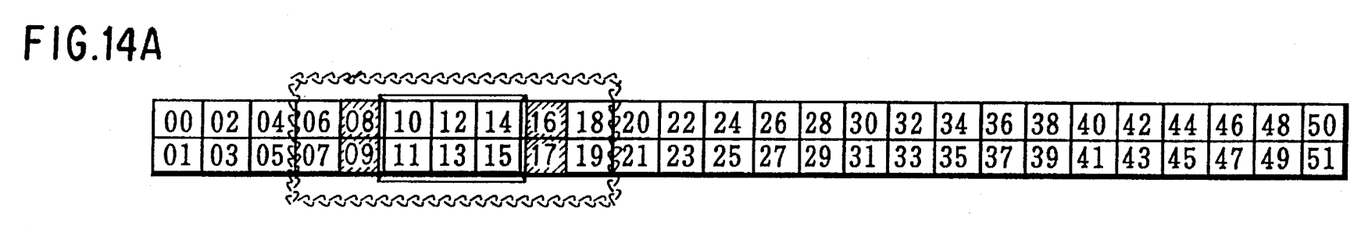
FIGS. 14A through 14C show information of images which are 2-level horizontally arranged FIGS. 15A through FIG. 15C respectively show displayed images corresponding to FIGS. 14A–14C.
Figure 14B:
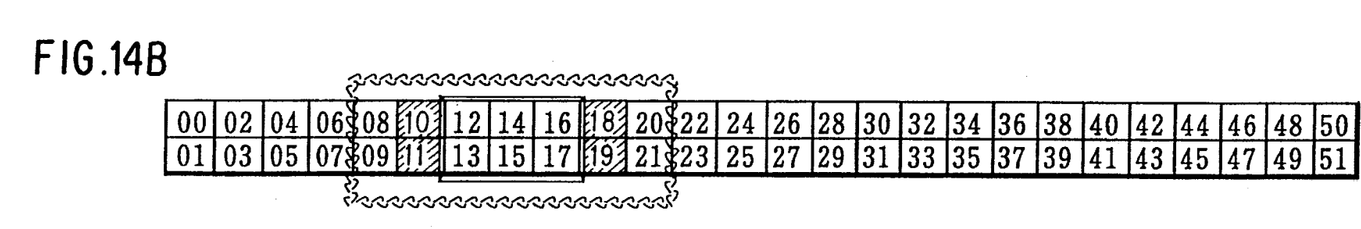
Figure 14C:
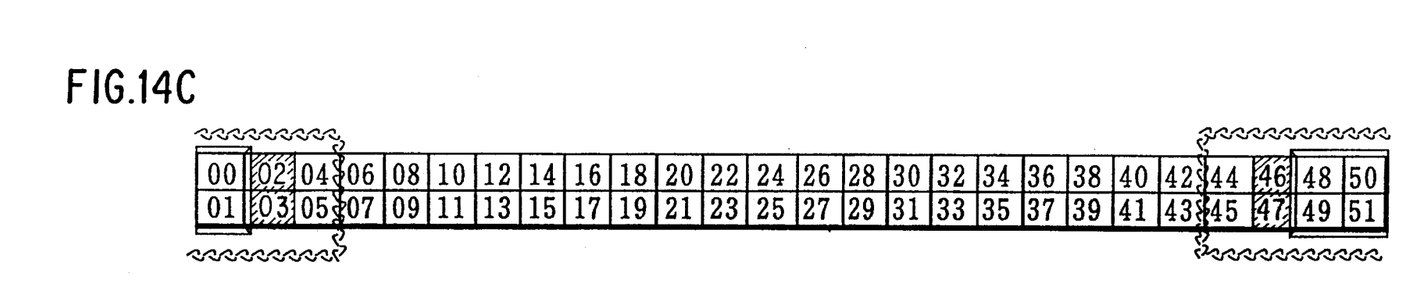
Figure 15A:
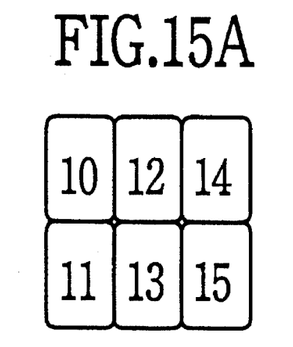
Figure 15B:
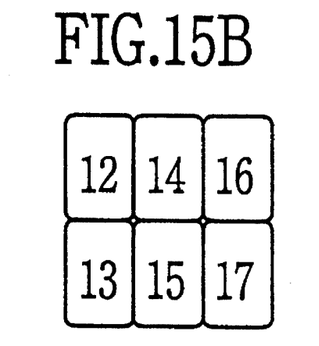
Figure 15C:
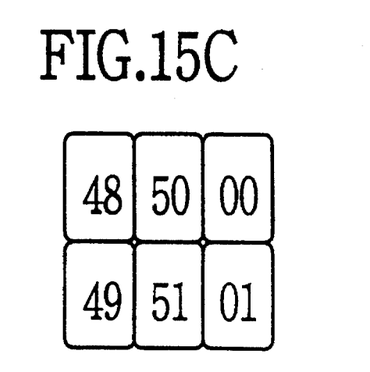
Figure 16:
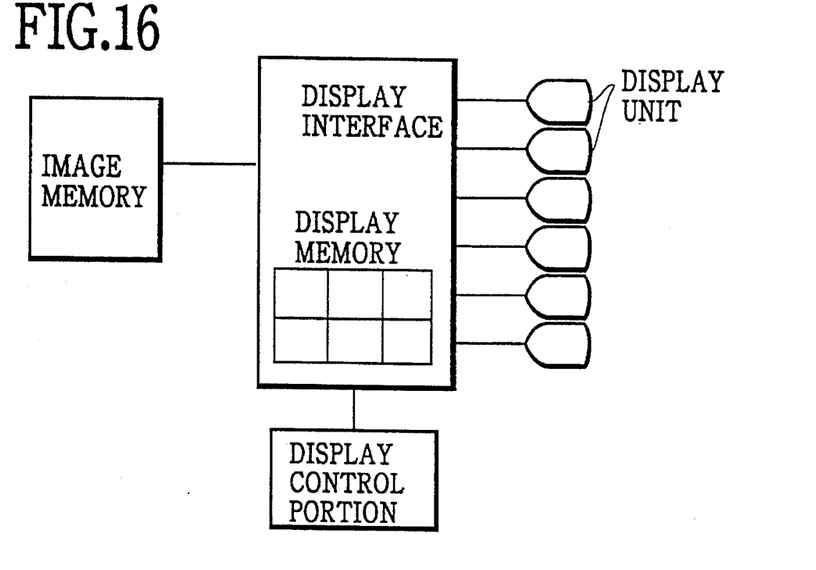
FIG. 16 shows a block diagram in order to achieve the smooth and continuous image changement.

FIGS. 14A, 14B and 14C as well as FIGS. 15A, 15B and 15C corresponded thereto show data arrangement where every two-level-disposed image is arranged in the same cyclic manner as depicted in FIGS. 10A, 10B, 10C as well as 11A, 11B, 11C. In the case where there are provided two-level arranged cyclic data arrays, there can be obtained a same significant effect as described above, namely, achieving to shift the image almost simultaneously.

Figure 12A:
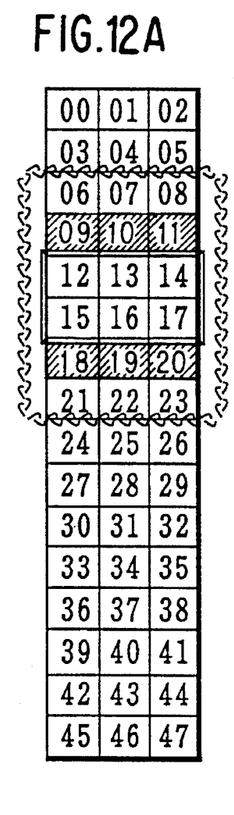
FIGS. 12A through 12C show information of images which are 3-level vertically arranged in a sequential manner.
Figure 12B:
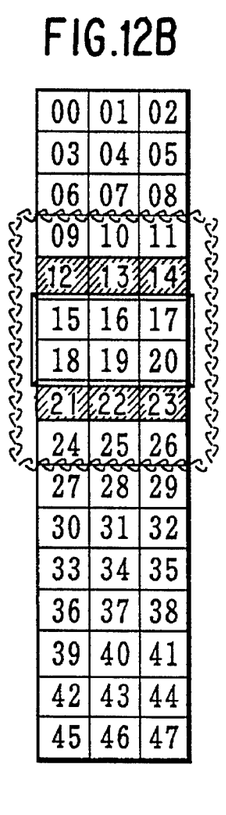
Figure 12C:
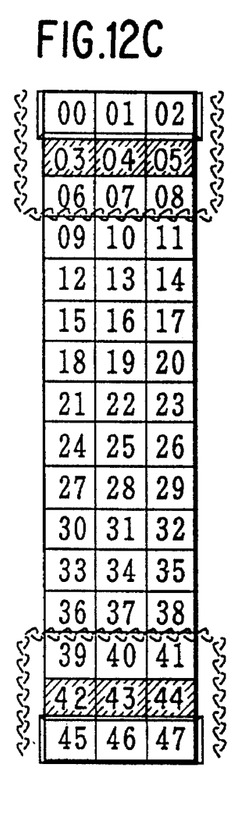
Figure 13A:
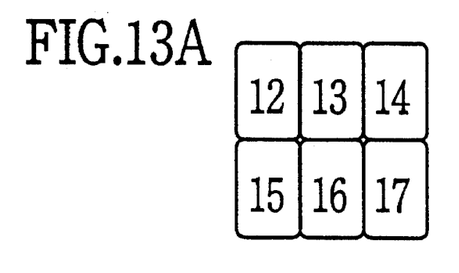
FIGS. 13A through 13C respectively show displayed images corresponding to FIGS. 12A–12C.
Figure 13B:
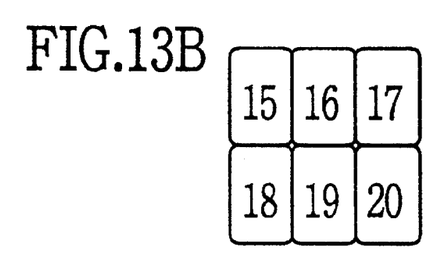
Figure 13C:
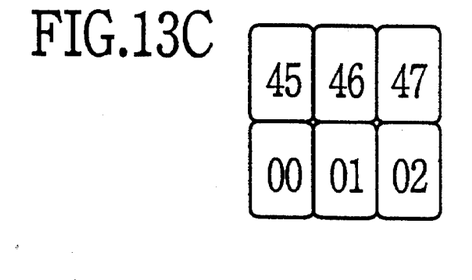

FIGS. 12A, 12B and 12C show a case where data is three-level vertically arranged in the cyclic manner. FIGS. 13A, 13B and 13C show the displayed data corresponding respectively to FIGS. 12A, 12B and 12C. In this case where the data is vertically arranged in a sense depicted in FIGS. 10A–10C and FIGS. 14A–14C, there is also obtained thereby the same significant effects as in the case where the data is arranged in a horizontally sequential manner.

Figure 17A:
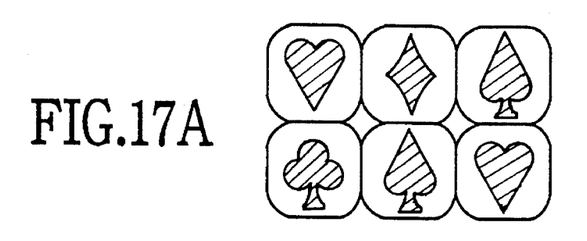
FIGS. 17A through 17C illustrate a sequential (in this order) image-transfer mechanism which is feature of the present invention realizing a smooth and continuous image changement.
Figure 17B:
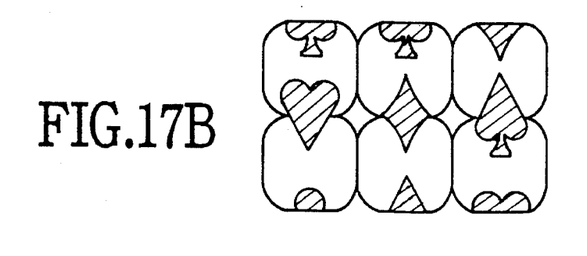
Figure 17C:
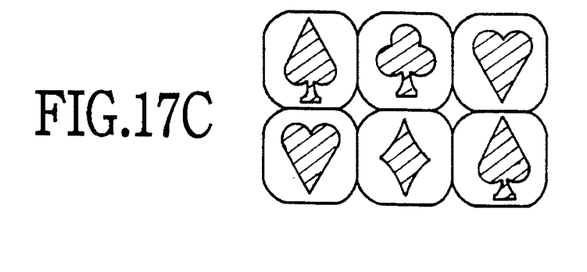

The present invention is further characterized in that, with reference to FIGS. 17A–17C, a smooth transfer of image on the display equipment is realized.

Referring to FIG. 16 and FIGS. 17A–17C, this smooth transfer of the image is realized by providing a display interface having a display memory that operates corresponding to the image displayed on the display equipment on a one-to-one (1-1) basis, and a display controlling portion by which the image is read out of the image memory in a unit of line.

On the other hand, in the conventional practice, the image is read out of the memory in a unit of image itself. Since the present invention employs an technique where the image is read in a unit of line thereof, a continuous and smooth image changement becomes possible as shown in FIGS. 17A, 17B and 17C. Thereby, the multiple display system according to the present invention realizes that the picture on the display moves more accurately and the movement is further visibly confirmed, as compared to the conventional practice where the image is simply scrolled in a unit of the image itself.

Accordingly, the input device such as the mouse serving as interactive interface 1 is operated, while viewing the plural images displayed on the display equipment 7, so that the images displayed on respective display equipment 7 is changed smoothly and continuously. As a result, the image is selected by performing a simple operation and the selected image is displayed on the display equipment. It is to be noted that a significance of the present invention lies further in that this simple operability is executed while the operator views and confirms the image.

In summary, by employing the present invention, the image displayed on each display equipment can be changed continuously in all directions. Thereby, an image can be freely selected by the easy operation while directly confirming the displayed image, thus significantly improving the operability for the multiple-image display system.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A multiple display device comprising:

display means for displaying a plurality of images;

an interactive interface for outputting information signals in accordance with instructions of an operator to change or shift at least one of said plurality of images displayed by said display means;

a first memory for storing said plurality of images;

a second memory having a larger capacity and operating at a higher speed than said first memory, for storing enlarged images consisting of images stored in said first memory indicated by said information signals along with portions of said images which encompass the displayed images and are not displayed by said display means; and a display interface for selecting enlarged images stored in said second memory corresponding to said images indicated by said information signals and outputting the selected enlarged images to said display means for display thereof.

2. A multiple display device comprising:

display means for displaying a plurality of images;

an interactive interface for outputting information signals in accordance with instructions of an operator to change or shift at least one of said plurality of images displayed by said display means;

display control means for receiving said information signals and generating control signals to control said display means;

image administrating means for generating selection signals representing images selected by said operator to be changed or shifted;

a first memory for storing said plurality of images;

a second memory having a larger capacity and operating at a higher speed than said first memory, for storing enlarged images consisting of images stored in said first memory indicated by said selection signals along with portions of said images which encompass the displayed images and are not displayed by said display means; and a display interface for selecting the enlarged images stored in said second memory corresponding to said images indicated by said selection signals and outputting the selected enlarged images to said display means for display thereof.

3. A multiple display device according to any of claims 1,2, further comprising a third memory, connected to said second memory and serving as an auxiliary memory thereto in the event that said second memory must store further portions of said images which encompass the displayed images and are not displayed by said display means, beyond said capacity of said second memory.

4. A multiple display device according to claim 3, wherein said plurality of images are arranged sequentially and read cyclically from said first memory.

5. A method for changing or shifting at least one of a plurality of displayed images, comprising the steps of:

(a) storing said plurality of displayed images in a first memory;

(b) receiving instructions of an operator to change or shift at least one of said plurality of displayed images;

(c) generating selection signals in accordance with at least one of said displayed images selected by said operator to be changed or shifted;

(d) storing enlarged images consisting of images stored in first memory indicated by said selection signals along with portions of said images which encompass the displayed images and are not displayed, in a second memory having a larger capacity and operating at a higher speed than said first memory; and (e) selecting the enlarged images stored in said second memory corresponding to images indicated by said selection signals and outputting the selected enlarged images to be displayed.

6. A method according to claim 5, further comprising the step of:

(d-1) storing further portions of said images which encompass the displayed images and are not displayed in a third memory when a capacity of said second memory is exceeded.

* * * * *